United States Patent [19]

Cumming

[11] Patent Number: 4,478,459
[45] Date of Patent: Oct. 23, 1984

[54] TRAILER BRAKING SYSTEM
[75] Inventor: James C. Cumming, Pleasant Ridge, Mich.
[73] Assignee: Rockwell International Corporation, Pittsburgh, Pa.
[21] Appl. No.: 468,833
[22] Filed: Feb. 23, 1983
[51] Int. Cl.³ .............................................. B60T 13/74
[52] U.S. Cl. ............................................ 303/7; 303/15
[58] Field of Search ........................................ 303/7–9, 303/13–17, 53, 28–30, 25–27, 85, 64; 188/3 R

[56] References Cited
U.S. PATENT DOCUMENTS

| | | | |
|---|---|---|---|
| 3,482,885 | 12/1969 | Campanini | 303/7 |
| 3,497,268 | 2/1970 | Dobrikin | 303/15 X |
| 3,507,542 | 4/1970 | Cannella | 303/7 |

Primary Examiner—Douglas C. Butler

[57] ABSTRACT

An improved trailer braking system for a tractor-trailer configuration is of the type which includes a primary air reservoir on the tractor which supplies an auxiliary air reservoir on the trailer. A pedal brake actuator on the tractor selectively provides control air from the primary air reservoir on the tractor to a relay valve on the trailer which control air causes air from the auxiliary air reservoir to be directed to the brakes on the trailer. The improvement includes a secondary source of control air on the trailer in the form of a control air reservoir having a volume significantly smaller than the volume of the auxiliary air reservoir. The control air reservoir is supplied control air through a first line from the auxiliary air reservoir. A second line from the control air reservoir goes to the relay valve and includes a check valve therein to only allow the control air to be capable of passing from the control air reservoir to the relay valve. A normally open first valve element is in the first line and a normally closed second valve element is in the second line. An electrical solenoid for the first valve element and the second valve element which is actuated by an electrical signal which is produced when control air is provided by the pedal brake actuator closes the first valve element and opens the second valve element to provide control air from the control air reservoir to the control valve prior to control air from the primary air reservoir through the pedal brake actuator.

4 Claims, 2 Drawing Figures

TRAILER BRAKING SYSTEM

BACKGROUND OF THE INVENTION

1. Field of the Invention.

This invention relates to an improved trailer braking system and, more specifically, to such a system which utilizes a small control air reservoir on the trailer to provide a reliable secondary source of control air to a control valve for quickly and safely applying the trailer brakes prior to the arrival of normal control air from the tractor.

2. Description of the Prior Art.

As commerical tractor-trailer configurations are getting longer, in some cases including multiple trailers, and are operating on more congested highways, it is essential to ensure that the trailer braking systems operate properly for safe, reliable stopping. It has been found in many conventional tractor-trailer braking configurations that a time delay in the application of the trailer brakes has been experienced.

Normally, the tractor will include a primary air reservoir which is provided pressurized air by a compressor or the like which is driven by the vehicle engine. The primary air reservoir supplies pressurized air through piping to an auxiliary air reservoir located near the trailer axle. Additionally, the primary air reservoir is a source of air for a foot pedal actuator valve to provide control air for operating the tractor brakes and the trailer brakes. However, because of the length of the line extending from the actuator valve to the rearward portion of the trailer and the number of flow impediments in the line, there exists a significant time delay in the travel of the control air to the trailer brakes. Under an ideal system, air pressure would travel through clean, frictionless tubing at about the speed of sound. However, since the control air line includes valves, couplings, fittings and bends, a time delay of one-half a second or greater is not uncommon. With such a time delay, the brakes on the tractor are applied before those on the trailer. As a result, the tractor-trailer could experience problems during braking including the possibility of increased stopping distances or jackknifing.

In an effort to eliminate this problem, U.S. Pat. No. 3,497,268 diclosed the use of a small air tank located near the auxiliary air reservoir as an alternative source of control air for the operation of the trailer brakes. Operation of the small air tank is controlled by an electrical signal, such as the brake light signal, when the brake pedal on the tractor is depressed. The electrical signal is sent through wiring from the tractor to the trailer at the speed of light to eliminate the time delay which is experienced in the conventional system when the control air must travel the same distance. Specifically, the auxiliary air reservoir is coupled through a normally open, electrically operated valve to the small tank. The small tank is then coupled through a normally closed, electrically operated valve to one side of a two-way check valve. Normal control air from the tractor is supplied to the other side of the two-way check valve. The outlet of the two-way check valve is coupled to a relay valve, or control valve, for operation of the trailer brakes. Specifically, the relay valve receives a signal in the form of control air from either the tractor or a small air tank to, in turn, direct operating air from the auxiliary air reservoir to the trailer brake operating chambers. Depressing the foot pedal would send the electrical signal to close the normally open valve and to open the normally closed valve. It is assumed that the two-way check valve was to be used to insure that control air from the small air tank would be positively directed to the relay valve. However, there is some doubt that the system as disclosed in the U.S. Pat. No. 3,497,268 would function properly. The effective use of a two-way check valve as disclosed is highly questionable since such a valve arrangement would appear to prevent the release of control air from the relay valve or operating air from the trailer brake operating chambers which is essential for their proper operation.

It is also significant that the use of two electrically operated solenoid valves leaves the trailer braking system vulnerable to a malfunction which could result in an unsafe braking condition. Specifically, if the electrical wire going to the the normally open, electrically operated valve were to be broken, the electrical signal from the brake pedal would not function as intended to only supply of control air from the small air tank. Instead, both valves would be open at the same time so that air directly from the auxiliary air reservoir would be supplied to the relay valve. A similiar result would occur if a ground wire from the normally open, electrically operated valve were broken. Consequently, the operator would find that any movement of the brake pedal would produce a rapid, full braking force on the trailer rather than the gradual, adjustable braking force as normally required for safe vehicle operation.

It should be noted that the practical valve of any system which would improve the braking characteristics of a tractor-trailer configuration would be significantly improved if the system could be readily and simply employed without the requirement of any changes in the tractor electrical circuiting or braking system. There is some question whether the system shown in U.S. Pat. No. 3,497,268 could meet this requirement. There are standard tractor-trailer electrical plugs that must be used for proper interchange of tractors and trailers and the plugs presently operate near capacity. It is possible that the electrical current requirements for two solenoids would exceed that capacity.

SUMMARY OF THE INVENTION

It is therefore an objective of the invention to provide an improved trailer braking system which eliminates the delay time normally experienced at the trailer brakes and produces safe, reliable and efficient trailer braking.

There is anouther objective of this invention to provide an improved trailer braking system having a minimum number of components which will be relatively simple to provide and are capable of being installed in conjunction with existing tractor-trailer braking systems.

These and other objectives of the invention are provided in a preferred embodiment in the form of an improved braking systems for a trailer of the type which includes an auxiliary air reservoir on the trailer which is supplied by a primary air reservoir on the tractor. Brake actuation means on the tractor selectively provides control air from a primary source on the tractor to a control valve on the trailer. The control air cause the control valve to direct air from the auxiliary air reservoir to braking means on the trailer. The improvement includes a secondary source of control air on the trailer including a control air reservoir which has a volume significantly smaller than the volume of the auxiliary air reservoir. The control air reservoir is supplied control air through a first line from the auxiliary air reservoir. A second line from the control air reservoir goes to the control valve and includes a check valve therein to only allow control air to be capable of passing from the control air reservoir to the control valve. A normally open first valve element is in the first line and a normally closed second valve element is the the second line. An electrical valve actuator for the first valve element and the second valve element is actuated by an electrical signal from the brake actuator means to close the first valve element to isolate the control air reservoir from the auxiliary air reservoir and to open the second valve element to provide control air from the control air reservoir to the control valve prior to the arrival of control air from the primary source.

DETAILED DESCRIPTION OF PREFERRED EMBODIMENT

Figure 1:
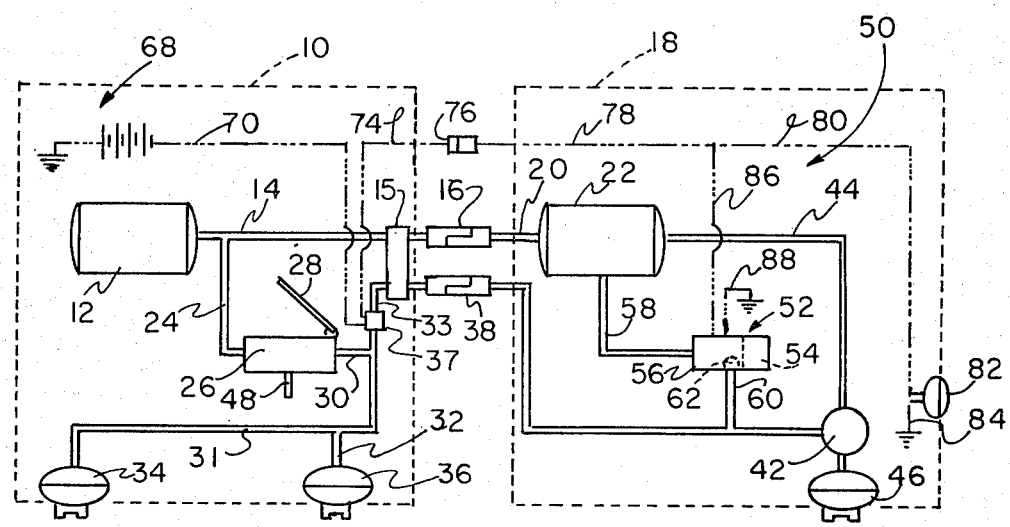
FIG. 1 is a schematic view of a braking system for a tractor-trailer configuration including various features of the invention.

As seen in FIG. 1, a schematic view of the tractor-trailer configuration includes various features of a conventional braking system and a preferred embodiment of the invention which provides the improvement thereto. The tractor 10 includes a primary air reservoir 12 which is supplied pressurized air from a compressor or the like (not shown) which is driven by the vehicle engine. An air line 14 passes rearwardly through a tractor protection valve 15 to a glandhand 16 between the tractor 10 and a trailer 18. An air line 20 connects the glandhand 16 to an axiliary air reservoir 22 which is physically located near the rear axle of the trailer 18.

Additionally, air from the primary air reservoir 12 is provided through an air line 24 to a brake acutation valve 26 which is regulated by a foot pedal 28 by the operator in the tractor 10. The brake actuation valve 26 reduces the pressure of the air from the primary air reservoir to serve as a primary source for control air which is discharged therefrom to a control air line 30. The pressure of the control air can be varied by the brake actuation valve proportionally to the amount of depression of the foot pedal 28 by the operator to regulate the pressure of the operating air being supplied to both the tractor brakes and the trailer brakes. Specifically, control air line 30 is connected to lines 31 and 32 to respectively deliver the control air to serve as the operating air to the brake operating chambers 34 at the forward axle and the brake operating chambers 36 at the rear axle of the tractor 10. Additionally, the control air is supplied rearwardly to line 33 through a pressure switch 37 and the tractor protection valve 15 to a glandhand 38 and a control line 40 in the trailer 18. Control air in line 40 is supplied to a relay valve 42 which acts as a control valve for the control of operating air to the the trailer brakes. The relay or control valve 42 allows operating air through air line 44 from the auxiliary air reservoir 22 to be directed to the brake operating chambers 46 of the trailer axle. It should be noted that in some installations a relay or control valve could also be provided for the brakes on the tractor 10 for the supply of operating air from the primary air reservoir 22 but, for the preferred embodiment, it has been found that the control air can be directly, satisfactorily employed to operate the brakes. To release the brakes, the operator releases the foot pedal 28 and the brake actuation valve is repositioned to exhaust the control air in lines 30, 31, 32, 33 and 40 through line 48. When the control air is no longer being supplied to lines 30, 31, 32, 33 and 40, the brakes in both the tractor 10 and trailer 18 will be released.

As thus described, the conventional braking system for the tractor-trailer configuration is capable of producing a sufficient braking force to stop the tractor 10 and the trailer 18. However, because of the time delay problem described hereinabove, the brakes on the tractor 10 would be applied prior to the brakes on the trailer 18 and a resulting loss of control during braking is possible.

To eliminate this problem, a preferred braking system 50 includes an alternative, closer source of control air for the control valve 42. The alternative source of control air can therefore be initially used to eliminated the time delay described hereinabove. Specifically, a secondary source 52 of the control air is provided in the form of a control air reservoir 54 within the interior of a housing 56. A first line 58 provides air from the auxiliary air reservoir 22 to the control air reservoir 54. A second line 60 provides control air from the control air reservoir 54 to the control valve 42 and includes a check valve 62 within the housing 56 which only allows the control air to be capable of passing from the control air reservoir 54 to the control valve 42.

To control the flow of air into and out of the control air reservoir 54, there is provided a normally open valve element 64 (FIG. 2) in line 58 and a normally closed valve element 66 (FIG. 2) in line 60. Although valve element 64 and 66 will be discussed in detail hereinbelow, it is sufficient at this time during the discussion of FIG. 1 to explain how they are actuated from their normal positions to faciliate the delivery of control air from the control air reservoir 54 to the control valve 42.

To operate valve elements 64 and 66, an electrical signal is provide to indicate when the foot pedal 28 of the brake actuation valve 26 is initially being depressed to provide control air to initiate braking. Although a separate circuit could be provided for this purpose, it has been found that a conventional trailer brake light circuit can be satisfactorily used to produce such a signal. Specifically, electrical poser from a source 68 in the tractor 10 is provided by a wire 70 to the pressure switch 37 or the like which is capable of indicating when initial movement of the foot pedal 28 has produced approximately 5 psi of control air in line 33. Although most existing tractors 10 employ such a pressure switch for brake light current, it would be possible to employ a contact switch such as found in U.S. Pat. No. 3,497,268 if one were alternatively being used on the tractor 10. when the foot pedal 28 is moved to apply the brakes, the control air causes the switch 37 to be closed to provide an electrical signal to a wire 74 going rearwardly to a connector 76. From the connector 76, a wire 78 in the trailer 18 provides the electrical signal to a brake light wire 80 to cause a brake light 82 to be energized. A ground line 84 is associated with the brake light 82 to complete the circuit.

As thus described, the electrical circuitry is a conventional brake light system. It should be clear that the electrical signal will travel rearwardly without the time delay which occurs when air is being used to travel the same distance. The present invention preferably alters the existing brake light system, on the trailer 18 but not the tractor 10, by including an electrical wire 86 which will also receive the electrical signal from wire 78. The wire 86 is connected to one side of a solenoid coil 96 within the housing 56 with the other side being connected to a ground wire 88 to complete the circuitry.

Figure 2:
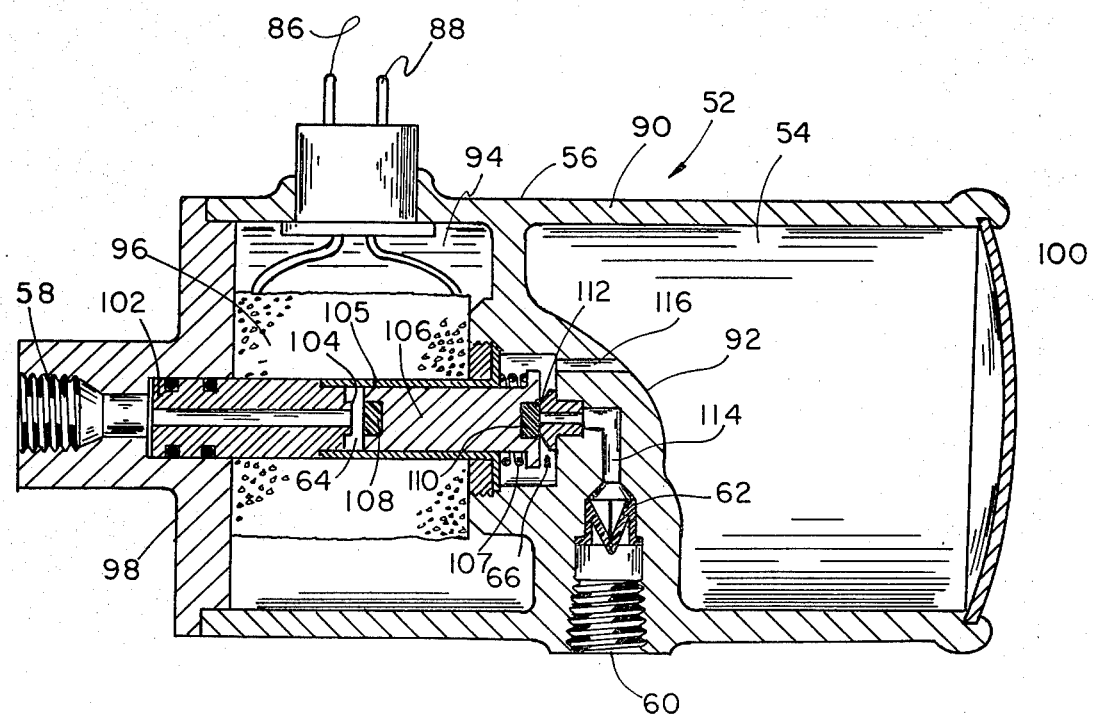
FIG. 2 is a sectional view of the preferred embodiment of the invention which includes the first valve element, the second valve element and control air reservoir in a single housing as shown in FIG. 1.

As seen in FIG. 2, the single housing 56 is provide in the preferred embodiment of the invention to include the first valve element 64, the second valve element 66, the control air reservoir 54 and the check valve 62. Specifically, the housing 56 includes an outside cylindrical wall 90 and a transverse, interidr wall 92 to seperate the control air reservoir 54 from an actuator region 94. The actuator region 94 includes the solenoid coil 96 which receives the signal current through electrical wire 86 and ground wire 88 when the brakes are applied. The housing 56 includes a first end plate 98 to which the first line 58 is centrally secured and a second end plate 100 which completes the definition of the control air reservoir 54. Within the actuator region 94, a tubular insert 102 is installed and includes a valve seat 104 which serves as a portion of the first valve element 64. The insert 102 includes a sleeve extension 105 which is welded, press fit or otherwise secured thereto to separate the valve elements 64 and 66 from the remainder of the actuation region 94 to prevent the loss of control air to the area containing the solenoid coil 96. A core 106 is mounted for axial movement within the interior of the solenoid coil 96 and the extention 105 and includes at one end thereof a closure element 108 of the first valve element 64. At the opposite end of the core 96 there is provided a similiar closure element 110 designed to seat against a valve seat 112 of the normally closed second valve element 66. The second valve element 66 is connected by an internal passage 114 to the check valve 62 and the second line 60.

The check valve 62 is preferably a "duck bill" type that includes a resilient element that is slit to open and allow air to pass therethrough in one direction but to close and prevent flow in the opposite direction. While the preferred system includes the check valve 62 within the housing 56, it would be possible to alternatively produce a separate check valve in line 60 and still fall within the scope of the invention as claimed.

As seen in FIG. 2, the valve elements 64 and 66 are shown in their normal positions with the core 106 being positioned to the right by the biasing of a spring 107 when no electrical signal is being received from the pressure switch 37. Air available at line 58 passes through the interior of the insert 102, along longitudinal grooves (not shown) in the surface of the core 106 and through a passage 116 to provide control air to the reservoir 54. During this normal operating condition, valve element 66 is closed to prevent any control air from the control air reservoir 54 or line 58 from being provided to the second line 60.

When the pressure switch 37 is actuated, the electrical signal to wire 86 will energize the solenoid coil 96 causing the core 106 to move axially to the left to close valve element 64 and simultaneously open valve element 66. As a result, air will no longer be provided through line 58 to the control air reservoir 54 and the control air within the control air reservoir 54 will be allowed to escape through passage 116 and the open valve element 66 to be delivered through check valve 62 to line 60. The supply of control air from line 60 to the control valve 42 will be much quicker than the control air being provided by the brake actuation valve 26 as described hereinabove. As a result, the trailer axle brakes will be rapidly applied without there being the time delay as described hereinabove. The volume of the control air reservoir 54 is relatively small to insure that the amount of control air being provided from this second source 52 in this manner will not basically control the trailer brakes but will only result in an initial movement of the control valve 42 to rapidly begin the application of the brakes. With only a limited volume of control air from the control air reservoir 54, the control air from the brake actuator valve 26 is primarily relied upon for signalling the extent and degree of braking air to be provided by the control valve 42. Once the control air reservoir 54 is connected by valve element 66 to line 60, the variations in the pressure of the control air to the control valve 42 from the brake actuation valve 26 will not be affected by the control air reservoir 54 because of check valve 62 in line 60. When the brakes are released, the exhaust line 48 of the brake actuation valve 26 will discharge control air from lines 30, 31, 32, 33 and 40 to allow release of all of the brakes on the tractor-trailer configuration. Similarly, when the control air pressure reduces to a low level, the switch 37 will be opened to discontinue the electrical signal to the solenoid coil 96 and the brake light 82. With a loss of electrical current through the solenoid coil 96, spring 107 will act on the core 106 to return it to its normal position to reopen the first valve element 64 and to close the second valve element 66.

As thus described, the secondary source 52 of control air from the control air reservoir 54 is supplied by the valve element 64 and evacuated by valve element 66 includes features which are fail safe and would not interfere with normal brake operation even if some type of electrical failure were to occur. Specifically, if electrical wire 70, 74, 78, 86 or 88 or connecter 76 were to be broken, the secondary source 52 would not be available is eliminate the time delay described hereinabove but the braking system would continue to operate in the normal manner as described. If there were a break in wires 80 or 84 associated with the brake light 82, the brake light would not function but the secondary source 52 of control air would still function to improve the application of the brakes in the trailer 18.

Additionally, since the control air reservoir 54 would be repeatedly supplied and discharged each time the foot pedal 28 is used, it is important to realized that the volume of the control air reservoir 54 is significantly smaller than the volume of the auxiliary air reservoir 22. As a result, there should never be a depletion of the amount of air in the auxiliary air reservoir 22 which could adversely affect trailer braking. Since the volume of the control air reservoir in a typical tractor-trailer configuration should be within the range of about 20 to 30 cubic inches, the preferred embodiment of the invention utilizes the single housing 56 for the major components to minimize the number of connections needed to mate with a conventional tractor-trailer braking system. Further, the use of the single housing 56 eliminates the connecting lines between the valves and the control air reservoir as was taught in the prior art system. Clearly, any number of alterations to the preferred embodiment could be made without departing from the invention as claimed.

I claim:

1. An improved braking system for a trailer of the type which includes a primary air reservoir on a tractor, an auxiliary air reservoir on said trailer which is supplied by said primary air reservoir, brake actuation means on said tractor to selectively provide control air from a primary source on said tractor to a control valve on said trailer, and said control air causing said control valve to direct air from said auxiliary air reservoir to braking means on said trailer, wherein said improvement comprises:
   a secondary source of said control air on said trailer including a control air reservoir having a volume significantly smaller than a volume of said auxiliary air reservoir;
   said controlled air reservoir being supplied said control air through a first line from said auxiliary air reservoir;
   a second line from said control air reservoir to said control valve said second line having a check valve therein to only allow said control air to be capable of passing from said control air reservoir to said control valve;
   a normally open first valve element in said first line;
   a normally closed second valve element in said second line;
   an electrically operated valve actuator for said first valve element and said second valve element being actuated by an electrical signal from said brake actuation means to close said first valve element to isolate said control air reservoir from said auxiliary air reservoir and to open said second valve element to provide said control air from said control air reservoir to said control valve prior to arrival of said control air from said primary source; and
   said electrically operated valve actuator including a solenoid coil and a core which is mounted for axial movement within said coil between a first position and a second position, said core being normally biased to said first position to open said first valve element and closed said second valve element, said core being moved to said second position by said electrical signal in said solenoid coil to close said first valve element and open said second valve element.

2. The improved braking system as set forth in claim 1, wherein said core includes a first closure element of said first valve element at one end thereof and a second closure element of said second valve element at an opposite end thereof.

3. The improved braking system is set forth in claim 1, further including a single housing for said first valve element, said second valve element, said valve actuator and said control air reservoir.

4. The improved braking system as set forth in claim 3, wherein single housing includes said check valve therein.

* * * * *